United States Patent Office 3,256,559
Patented June 21, 1966

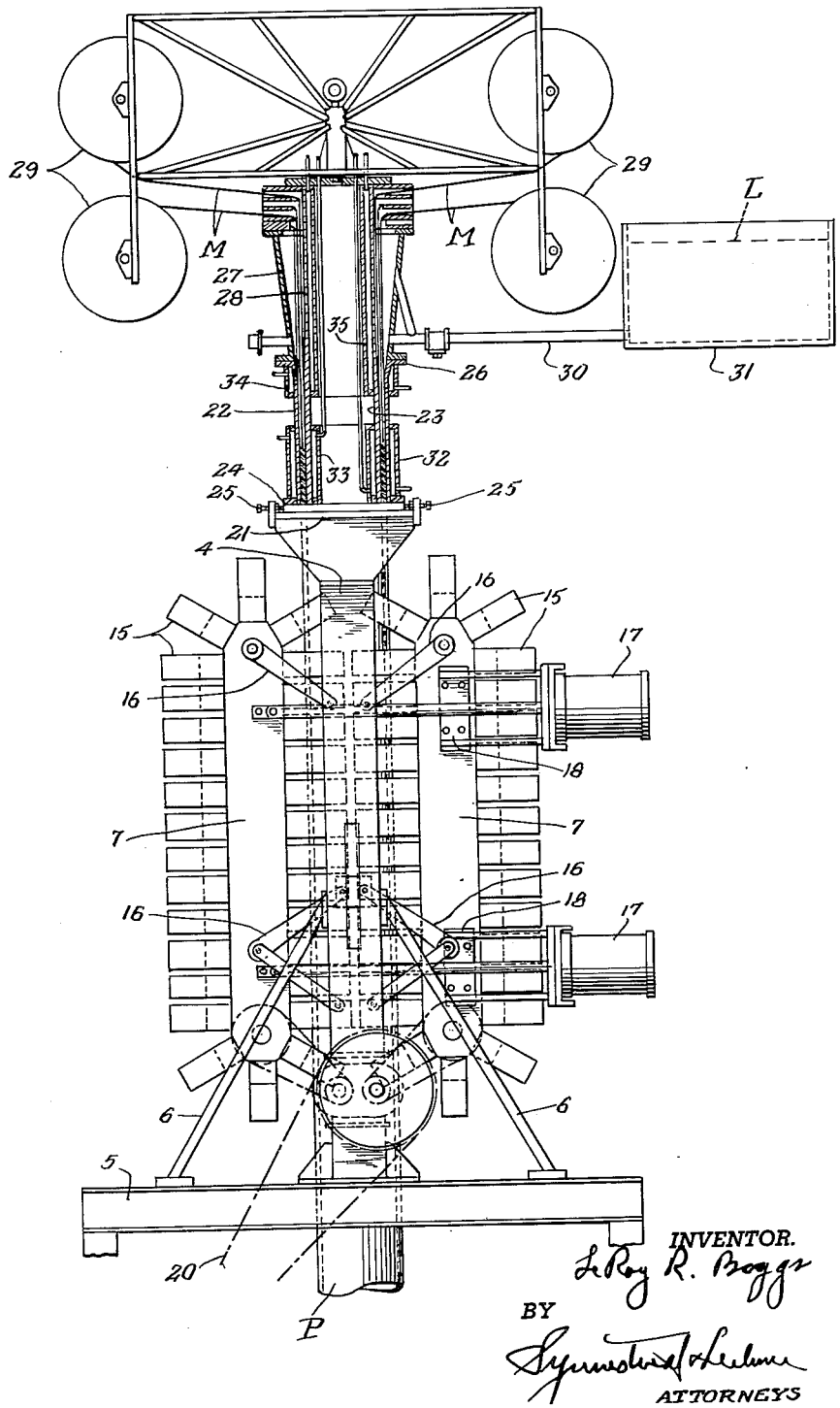

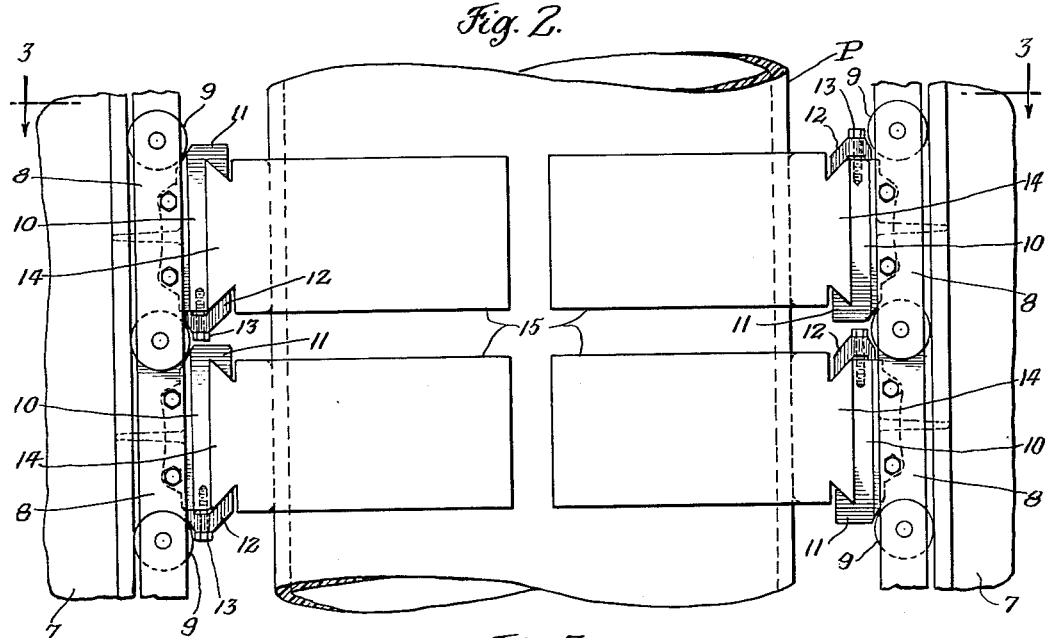
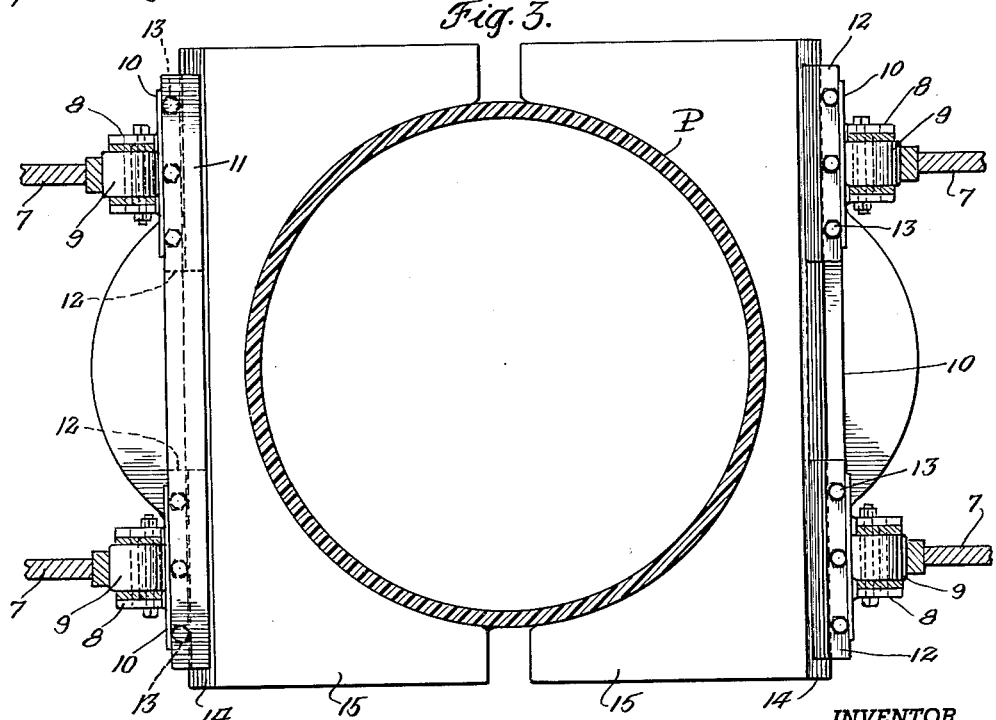

3,256,559
EQUIPMENT FOR MAKING ARTICLES COMPOSED OF FIBER REINFORCED RESIN MATERIALS
Le Roy R. Boggs, Bristol, Tenn., assignor to Universal Moulded Fiber Glass Corp., Bristol, Va., a corporation of Delaware
Filed June 17, 1963, Ser. No. 288,265
10 Claims. (Cl. 18—4)

This invention relates to equipment for making resin articles or shapes, especially such articles or shapes composed of fiber reinforced resin materials.

Although various features of the invention have wide applicability, the equipment is particularly adaptable to the production of articles by a technique according to which fibrous reinforcement, such as glass fiber mats, woven glass fabrics or glass rovings are impregnated with a heat hardenable liquid resin material, such for example as the well-known polyester laminating resins, the impregnated reinforcement being fed through a forming passage in which the resin material is heated to solidify the resin and harden the article. Such a system is disclosed in my copending application Serial No. 115,633, filed June 8, 1961, now Patent No. 3,167,462, issued October 6, 1964, and as there disclosed the hardened article is drawn from the discharge end of the forming passage by means of a puller mechanism comprising opposed gripping elements which engage the solidified piece and which are driven to pull on the piece and thus deliver the formed piece from the forming passage and also draw the reinforcement and resin into the forming passage.

The present invention is particularly concerned with the puller mechanism and also, in certain aspects of the invention, with the relationship between the puller mechanism and the forming device in which is provided the forming passage above referred to.

With equipment and in an operation of the kind described above it is desirable that the gripping elements of the puller mechanism accurately engage the formed piece after it emerges from the discharge end of the forming passage and that the gripping elements be accurately in a definite relation to the axis of delivery of the solidified article from the discharge end of the forming passage. Accordingly, it is an important object of the present invention to provide equipment serving to establish accurate alignment of the gripping elements of the puller mechanism with the solidified piece. In the preferred arrangement of the invention such accuracy of alignment is provided for in each of two planes, each containing the axis of discharge of the solidified piece from the forming passage, such two planes being at right angles to each other. In this way any tendency toward misalignment in any plane or direction may be compensated for or eliminated.

How the foregoing objects and advantages are attained, together with others which will occur to those skilled in the art will be clear from the following description referring to the accompanying drawings in which—

FIGURE 1 is an elevational view of equipment according to the present invention including puller mechanism, a forming device and resin and fiber reinforcement supply systems, most of the parts being shown in elevational outline, but certain parts of the forming device being shown in vertical section;

FIGURE 2 is an enlarged side elevational view of certain of the gripping elements of the puller mechanism and the mounting of those elements on the carrier or driving structure for the gripping elements, this view also showing a portion of a solidified article being gripped by the gripping elements; and FIGURE 3 is a transverse sectional view of parts shown in FIGURE 2, this view being taken as indicated by the section line 3—3 on FIGURE 2.

The equipment illustrated in FIGURE 1 is vertically arranged, i.e., arranged for vertically downward feed of the materials and of the article being formed, such article in this case comprising a pipe indicated at P. Although the equipment may be arranged for the production of pieces of a variety of sizes and types, the equipment as illustrated is particularly adapted to the production of large diameter pieces, such as a pipe of the order of about 17 inches in diameter, with a wall thickness of about the order of ½ inch. It is here noted that certain features of the equipment illustrated in the drawings and described below are also disclosed in my copending application Serial No. 288,422 filed concurrently herewith.

The apparatus is mounted by means of the frame structure 4 of the puller mechanism which mechanism appears in the lower half of FIGURE 1. The frame 4 is mounted at its lower end on supporting beams 5, angled braces 6 also being provided to maintain the equipment in upright position.

The puller mechanism is of the crawler tread type, the general arrangement of which is disclosed in my copending application Serial No. 142,749, filed September 18, 1961, now Patent No. 3,151,354. Here the puller mechanism is shown as being provided with a pair of crawler tread frames 7—7 which are mounted on the main frame structure 4. Each tread frame structure 7 (see FIGURES 2 and 3) serves to carry tread links 8 which ride on the periphery of the tread frame structures 7 by means of rollers 9. As is clearly seen in FIGURE 3, each of the tread frame structures comprises a pair of tread frame plates, and pairs of links 8 and rollers 9 are provided. Extended transversely of each pair or set of links a gripping element supporting plate is provided as indicated at 10, each such plate having a shouldered or hook portion 11 at one edge. At the opposite edge is a separately formed clamping hook part 12 adapted to be secured to the plate 11 by bolts 13. The two hook parts 11 and 12 cooperate to form a dovetail socket to receive the dovetail mounting part 14 provided at the base of each of the puller blocks 15. From FIGURES 2 and 3 it will be seen that the puller blocks are here shaped to engage most of the periphery of the pipe P being made, and from these views it will further be seen that the dovetail connection between the puller blocks and the mounting plates 10 provides for shifting movement of the puller blocks with respect to the frame structures of the crawler treads in a plane transverse the axis of the pipe, i.e., transverse the axis of the discharge of the article being formed from the forming device, which latter is described hereinafter.

The frame structures 7 of the tread devices are mounted on the main frame 4 of the puller mechanism by means of links 16 which provide for orbital motion of the crawler treads with relation to the main frame 4, in a manner which is fully explained in my copending application Serial No. 142,749 above referred to. As disclosed in said copending application the two crawler treads are also urged toward each other by means of pneumatic cylinders two of which are here indicated at 17—17, the cylinders being connected by means of bracket structures 18 with one of the tread frames 7 and by means of piston rods with the frames 7 of the other crawler tread.

Driving means including a driving chain such as shown at 20 and other transmission parts which need not be considered in detail herein are also provided, as in the mechanism disclosed in my copending application 142,749, for the purpose of actuating the crawler treads and causing the gripping elements carried thereby to travel along the desired feed path and thus pull the formed piece through the system.

As shown in FIGURE 1, surmounting the upper end of the puller frame 4 there is an annular thrust plate 21 on which the forming device itself is mounted. This device comprises a die part 22 and a core part 23 within the die and cooperating therewith to define an angular passage through which the materials are fed and from which the solidified article is discharged at the lower end adjacent the upper end of the puller mechanism. At its lower end the die part 22 is associated with a mounting flange or plate 24 resting upon the thrust or abutment plate 21 of the puller frame 4 and shiftable with respect to the plate 21 in a horizontal direction. Bolts 25 are provided to fix the plates 24 and 21 in any desired relative positions. This arrangement may include provision for shifting the die 22 either in the plane of FIGURE 1 or a plane at right angles to FIGURE 1. Provision for shifting movement in the plane of the drawing, however, is of particular importance because this enables accurate alignment of the axis of discharge of the piece being formed with respect to the line of pull of the puller mechanism in the plane in which the gripping elements are urged toward each other by means of the pneumatic cylinders 17.

At its upper end the die part 22 is provided with a bolting flange 26 serving to mount the die extension 27 which comprises a structural part adapted to mount the upper end of the core extension 28 in the manner fully described in my above mentioned copending application filed concurrently herewith.

For forming the article, fibrous reinforcement elements such as glass fiber mats M are supplied from reels 29, these mats being fed through apertures in the structure at the top of the forming device and thence downwardly through the interior of the structure 27 and ultimately into the forming passage provided between the die part 22 and the core part 23.

A heat hardenable liquid resin is introduced into the interior of the structure 27 through a connection 30 which communicates also with the supply tank 31 in which a supply of resin is maintained, for instance up to the level indicated at L, which level is thus also maintained in the interior of the structure 27.

The die part 22 is provided with an external heating jacket 32 and the core part 23 is provided with an internal heating jacket 33 in order to heat the resin material as it passes through the forming passage and thereby soldify the resin and the article being formed. A cooling jacket 34 surrounds the upper or entrance end of the die part 22 and within the upper portion of the core part 23 and also the upstream core extension 28 there is a cooling jacket 35, the jackets 34 and 35 providing against solidification of the resin in the entrance end of the forming passage and also in the body of resin contained within the core supporting structure 27.

As the fiber reinforcements descend through the interior of the structure 27 they become impregnated with the liquid resin and enter and fill the forming passage in that condition.

It will be noted that in the arrangement as described above and as illustrated in the drawings, the gripping elements or gripper blocks 15 of the puller mechanism are shiftably movable on the mounting parts therefor in a direction transverse to the plane in which the two crawler treads and thus the gripping blocks are urged toward each other for gripping engagement with the piece formed. Therefore in the making of any piece where the gripping blocks or elements interfit or interengage with various contours of the piece being made, the provision for this shifting movement enables accurate alignment of the gripping elements with the piece emerging from the forming device. It will further be noted that the freedom for shifting movement of the plate 24 and thus of the forming device with respect to the frame of the puller mechanism permits accurate alignment of the line of discharge of the piece being formed in a direction lying in the plane in which the crawler treads and gripping elements are urged toward each other to grip the piece. Thus this latter adjustment provides for accuracy of alignment of the line of discharge of the formed piece with the line of pull of the puller mechanism.

The provision of the dovetail mounting arrangement between the puller blocks and the mounting parts therefor and of the shifting movement of the forming device with respect to the frame structure, when taken together provides for accuracy of alignment in any direction, i.e., universally.

In connection with the dovetail mounting of the puller blocks on the supporting plates therfor, as illustrated in FIGURES 2 and 3 and as described above, it should further be mentioned that in certain instances it may be found desirable to tighten the bolts 13 and thus lock the blocks in a given position, after a given alignment has been established, although in certain other cases it has been found desirable to provide some freedom for shifting movement of the blocks even during operation, so as to accommodate minor inaccuracies in the path of feed of the article being made. In this latter case, the bolts 13 would not be drawn up so tight as to lock the blocks in a given path.

I claim:

1. Apparatus for making articles formed of fiber reinforced resin material, comprising a forming device having a forming passage therethrough having a cross sectional shape conforming with that of the article being made, means for delivering into the entrance end of the forming passage fiber reinforcement impregnated with a heat hardenable liquid resin material, means for heating the resin material to solidify it while it is passing through the forming passage, and a puller mechanism adapted to engage and pull on the solidified article beyond the discharge end of the forming passage, the puller mechanism including a pair of crawler tread devices yieldingly urged toward each other in a plane containing the axis of delivery of the solidified article from the discharge end of the forming passage and carrying opposed gripping elements shaped to interfit with portions of the sectional shape of the article being made, and means providing for shifting movement of the gripping elements with respect to the crawler tread devices in a plane substantially at right angles to said first plane.

2. Apparatus for making articles formed of fiber reinforced resin material, comprising a forming device having a forming passage therethrough having a cross sectional shape conforming with that of the article being made, means for delivering into the entrance end of the forming passage fiber reinforcement impregnated with a heat hardenable liquid resin material, means for heating the resin material to solidify it while it is passing through the forming passage, and a puller mechanism adapted to engage and pull on the solidified article beyond the discharge end of the forming passage, the puller mechanism including a frame structure and a pair of crawler tread devices each mounted for movement with respect to the frame structure and yieldingly urged toward each other in a plane containing the axis of delivery of the solidified article from the discharge end of the forming passage, means providing for shifting movement of the discharge end of the forming device with respect to the frame of the puller mechanism in said plane containing the axis of delivery of the solidified article. The puller mechanism further including opposed gripping elements carried by the crawler tread devices and shaped to interfit with portions of the sectional shape of the article being made, and means providing for shifting movement of the gripping elements with respect to the crawler tread devices in a plane substantially at right angles to said first plane.

3. Apparatus for use in making resin articles comprising a forming device having a forming passage therethrough and a puller mechanism adapted to engage and pull on the article being made beyond the discharge end of the forming passage, the puller mechanism comprising a frame structure and opposed travelling gripping elements mounted for movement with respect to the frame structure and yieldingly urged toward each other in a plane containing the axis of discharge of the article from the forming passage, and mounting means for the gripping elements providing for shifting thereof in a direction transverse said plane containing the axis of discharge of the article from the forming device.

4. Apparatus for use in making resin articles comprising a forming device having a forming passage therethrough and a puller mechanism adapted to engage and pull on the article being made beyond the discharge end of the forming passage, the puller mechanism comprising a frame structure and opposed gripping elements mounted for relative gripping movement with respect to each other in a plane containing the axis of discharge of the article from the forming passage, means interconnecting the forming device and the frame structure of the puller mechanism and providing for relative shifting movement of the forming device and the puller mechanism in said plane, and mounting means for the gripping elements providing for shifting thereof in a direction transverse said plane.

5. A puller mechanism for use in pulling a formed resin article through and from the forming passage of a forming device comprising a crawler tread device having a series of links, gripping elements carried by the links, means for urging the tread device in a direction toward the article beyond the discharge end of the forming passage, and means mounting the gripping elements on the tread links and providing for shifting thereof with respect to the links in a direction transverse to the direction in which the tread device is urged toward the article.

6. A construction according to claim 5 in which the mounting means for the gripping elements comprises complementary dovetail parts provided on the gripping elements and on the tread links.

7. A construction according to claim 5 in which the mounting means for the gripping elements includes fastening means for securing the gripping elements in any of a plurality of shifted positions thereof.

8. A puller mechanism for use in pulling a formed resin article through and from the forming passage of a forming device, comprising a crawler tread device having a series of links, gripping elements shaped to interfit with the sectional shape of the article being made, the gripping elements being carried by the tread links, means for urging the tread device in a direction toward the article to bring the gripping elements into interfitting relation with the article beyond the discharge end of the forming passage, and means mounting the gripping elements on the tread links and providing for shifting thereof with respect to the links in a direction transverse to the direction in which the tread device is urged toward the article.

9. A puller mechanism for use in pulling a formed resin article through and from the forming passage of a forming device, comprising a pair of crawler tread devices arranged for relative movement in a direction toward and away from each other to provide for gripping of the article being made therebetween, opposed gripping elements having gripping surfaces configured to interfit with portions of the external sectional contour of the article being made, the gripping elements being carried by the tread devices and movably mounted thereon to provide for shifting of the gripping elements in a direction transverse the direction in which the tread devices are movable toward and away from each other.

10. A construction according to claim 9 in which each of the gripping elements is mounted on a tread device by means of complementary dovetail connection parts providing a guideway extended transversely of the direction of motion of the tread devices.

References Cited by the Examiner

UNITED STATES PATENTS

| | | | |
|---|---|---|---|
| 1,905,663 | 4/1933 | Wallace | 18—6 |
| 2,189,254 | 1/1940 | Wallace | 18—6 |
| 2,770,021 | 11/1956 | Harter et al. | 22—57.2 |
| 2,887,721 | 5/1959 | Blachi et al. | 18—13 X |
| 2,990,577 | 4/1961 | Delaubarlde | 18—14 |
| 3,134,150 | 5/1964 | Parlse et al. | 22—57.2 |

WILLIAM J. STEPHENSON, *Primary Examiner.*